(12) United States Patent
Kunberger

(10) Patent No.: US 11,536,848 B2
(45) Date of Patent: Dec. 27, 2022

(54) ABSORBER DEVICE FOR DISPLAYING SIGNALS OF CONVENTIONAL LIGHT SYSTEM INSTALLATIONS AND ASSISTANCE SYSTEM FOR A VEHICLE

(71) Applicant: Bayerische Motoren Werke Aktiengesellschaft, Munich (DE)

(72) Inventor: Jan-Mark Kunberger, Munich (DE)

(73) Assignee: Bayerische Motoren Werke Aktiengesellschaft, Munich (DE)

(\*) Notice: Subject to any disclaimer, the term of this patent is extended or adjusted under 35 U.S.C. 154(b) by 299 days.

(21) Appl. No.: 16/762,407

(22) PCT Filed: Jan. 28, 2019

(86) PCT No.: PCT/EP2019/052004
§ 371 (c)(1),
(2) Date: May 7, 2020

(87) PCT Pub. No.: WO2019/149662
PCT Pub. Date: Aug. 8, 2019

(65) Prior Publication Data
US 2020/0348417 A1    Nov. 5, 2020

(30) Foreign Application Priority Data

Jan. 30, 2018   (DE) .................... 10 2018 201 374.8

(51) Int. Cl.
*G01S 17/931*    (2020.01)
*G01S 13/931*    (2020.01)
(Continued)

(52) U.S. Cl.
CPC .......... *G01S 17/931* (2020.01); *G01S 13/931* (2013.01); *G01S 13/951* (2013.01);
(Continued)

(58) Field of Classification Search
None
See application file for complete search history.

(56) References Cited

U.S. PATENT DOCUMENTS 4,316,652 A * 2/1982 Auer, Jr. ................ G02B 5/005
                                              359/867
4,652,851 A * 3/1987 Lewin .................... G08G 1/095
                                              349/1
(Continued)

FOREIGN PATENT DOCUMENTS

DE   10 2015 011 869 A1   3/2017
EP      1 118 973 A2       7/2001
(Continued)

OTHER PUBLICATIONS

International Search Report (PCT/ISA/210) issued in PCT Application No. PCT/EP2019/052004 dated Apr. 26, 2019 with English translation (five pages).

(Continued)

*Primary Examiner* — Bernarr E Gregory
(74) *Attorney, Agent, or Firm* — Crowell & Moring LLP

(57) ABSTRACT

An absorber device for electromagnetic sensor systems has at least one aperture. Each aperture is able to be opened and closed by an aperture closure. The absorber device is designed in such a way that when the aperture is open, electromagnetic waves incoming through the aperture do not then leave the absorber device, and when the aperture is closed, electromagnetic waves impinging on the aperture are reflected.

8 Claims, 3 Drawing Sheets

(51) Int. Cl.
*G01S 13/95* (2006.01)
*G08G 1/0967* (2006.01)
*G01S 13/00* (2006.01)

(52) U.S. Cl.
CPC ............... *G08G 1/096708* (2013.01); *G01S 2013/9316* (2020.01); *G01S 2013/9329* (2020.01)

(56) References Cited

U.S. PATENT DOCUMENTS

| | | | | |
|---|---|---|---|---|
| 4,962,450 | A | * | 10/1990 | Reshetin ............... G08G 1/095 362/296.07 |
| 6,731,433 | B2 | * | 5/2004 | Jacobsen ............... G08G 1/095 359/599 |
| 7,535,406 | B2 | * | 5/2009 | Teranishi ............. G01S 17/931 342/70 |
| 9,442,487 | B1 | * | 9/2016 | Ferguson ........... G08G 1/09623 |
| 2002/0113561 | A1 | | 8/2002 | Jacobsen et al. |
| 2013/0253754 | A1 | * | 9/2013 | Ferguson ............. G06V 20/584 701/28 |
| 2015/0210278 | A1 | * | 7/2015 | Ben Shalom .......... G08G 1/167 382/104 |

FOREIGN PATENT DOCUMENTS

| | | |
|---|---|---|
| EP | 1 215 640 A2 | 6/2002 |
| EP | 3 370 215 A1 | 9/2018 |
| WO | WO 2014/051417 A1 | 4/2014 |

OTHER PUBLICATIONS

German-language Written Opinion (PCT/ISA/237) issued in PCT Application No. PCT/EP2019/052004 dated Apr. 26, 2019 (six pages).

German-language Office Action issued in German Application No. 10 2018 201 374.8 dated Dec. 5, 2018 (three pages).

German-language German Decision to Grant issued in German Application No. 10 2018 201 374.8 dated Feb. 7, 2019 with English translation (eight pages).

\* cited by examiner

ABSORBER DEVICE FOR DISPLAYING SIGNALS OF CONVENTIONAL LIGHT SYSTEM INSTALLATIONS AND ASSISTANCE SYSTEM FOR A VEHICLE

CROSS-REFERENCE TO RELATED APPLICATIONS

This application is a National Phase entry of International Patent Application No. PCT/EP2019/052004, filed on Jan. 28, 2019, which claims priority from German Patent Application No. DE 10 2018 201 374.8, filed on Jan. 30, 2018, the entire disclosures of which are expressly incorporated herein by reference.

BACKGROUND AND SUMMARY OF THE INVENTION

The present invention relates to an absorber device for a light signal installation or light system installation and to an absorber device assistance system for a vehicle.

To control road traffic it is customary practice to use light signal installations, light system installations or traffic light installations. In this case, it is known to use traffic lights as signal transmitters. Traffic lights order specific behavior for the road users by virtue of their emitting controlled luminous signals or light signals. A standard European light signal installation controls traffic with the aid of the three signal colors red, amber and green. In this case, these light signals of the traffic lights are directed to the respective driver of a vehicle. However, the use of traffic lights is unsafe and thus not suitable not least in the course of the introduction of autonomous driving or at least partly autonomous driving modes (e.g. the vehicle moves autonomously only in specific situations or on specific roads) using sensor systems. It is indeed known to provide a driver assistance system which detects the signal colors of the respective traffic lights with the aid of a camera and displays them to the driver of the vehicle by way of a suitable display unit in the vehicle. However, on account of the risk of misinterpretation (e.g. the signal color cannot be identified on account of difficult visibility conditions), the use of camera-based or optical systems for evaluating the respective light signal of the traffic lights is unsafe and thus a potential hazard for road traffic. In other words, the probability of failure of the optical systems is dependent on atmospheric conditions. Furthermore, present-day computer systems are able to identify signal installations as such only to a very limited extent. Such a procedure is thus unsuitable, particularly with regard to autonomous driving.

The object of the invention is to avoid the aforementioned disadvantages and to demonstrate a solution that enables a vehicle to reliably identify the signals of the light signal installation without human assistance or human assessment.

This object is achieved according to the invention by means of the features of the independent claims. The dependent claims relate to preferred embodiments.

The object mentioned above is achieved by an absorber device for electromagnetic sensor systems, wherein the absorber device has at least one aperture, each of which is able to be opened and closed by way of an aperture closure. The absorber device is embodied in such a way that in each case:
 when the aperture is open, electromagnetic waves arriving through the aperture do not leave the absorber device again; and
 when the aperture is closed, electromagnetic waves impinging thereon are reflected.

The term electromagnetic sensor systems encompasses sensor systems which, by emitting signals or waves and by detecting the signals or waves reflected or backscattered from the atmosphere, are able to create a model of the surroundings or parts of a model of the surroundings of a vehicle.

The geometry and the surface material of the absorber device are such that they reflect, backscatter or absorb the signals or waves of the electromagnetic sensor systems. In other words, the electromagnetic sensor systems can identify the absorber device as an object. By way of example, the absorber device can be embodied in the form of a cone, a cylinder, a rectangle, or some other suitable geometry.

The absorber device comprises at least one aperture. Each aperture or opening is an opening through which the signals or waves of the electromagnetic sensor systems can penetrate. Each of the apertures is able to be opened and closed by way of an aperture closure. Each aperture can be able to be opened and closed by means of a dedicated, highly reliable mechanism. Dependable or highly reliable mechanisms are known from the prior art; by way of example, consideration is given to a spring system and to the use of an electromagnet as actuator. In addition or as an alternative thereto, intelligent glass or smart glass can also be used in order to regulate the transparency of the aperture. Smart glass is a tintable glazing or comprises tintable glazings, the light transmissivity of which varies as a result of the application of an electrical voltage or heating.

If the respective aperture is closed, the signals or waves of the electromagnetic sensor systems are also reflected in the region of the respective aperture and the backscattered signals or waves are received again by the respective sensor system. In other words, the sensor system cannot differentiate the respectively closed aperture from the housing of the absorber device or the aperture appears significantly "brighter" than the housing.

If a respective aperture is open, the absorber device is embodied in such a way that the signals or waves of the electromagnetic sensor systems penetrate into the interior of the absorber device through the aperture, but cannot leave the interior of the absorber device again. Similar systems are known as radiation calorimeters e.g. from solar technology.

As a result, the electromagnetic sensor system is able to differentiate the respective aperture in the open state unambiguously from the housing of the absorber device.

Advantageously, signal states of a traffic light can thus be mapped by the absorber device in a reliable manner for electromagnetic sensor systems.

By way of example, the following signal states of an absorber device having two apertures can reproduce the luminous signals of a traffic light:

| Traffic light | Absorber device |
| --- | --- |
| Red: | Both apertures are closed; |
| Amber: | One aperture is open and the respective other aperture is closed; |
| Green: | Both apertures are open. | of example, an absorber device having only one aperture is also conceivable, by means of which only the luminous signals red (aperture closed) and green (aperture open) are mapped, wherein for example the luminous signal amber can also be assigned to the luminous signal red (aperture closed).

Electromagnetic sensor systems operate with electromagnetic wavelengths that can be used reliably over a very wide atmospheric interference range. In other words, electromagnetic sensor systems can be used independently of the weather. Existing traffic light installations can be extended in a simple manner by absorber systems, the signal state of which can be detected dependably and reliably by electromagnetic sensor systems. This is of major importance, particularly for autonomous driving. However, conventional driver assistance systems that display traffic light signals to the user by way of an output unit in the vehicle can also benefit from the reliable identifiability of the signal states by way of electromagnetic sensor systems. If the vehicle is equipped with at least two technologically different electromagnetic sensor systems (e.g. radar and lidar) and both independently of one another can read the absorber system described, the traffic light signal can be read by a sensor system with diversity. The likelihood of traffic lights being read erroneously decreases very quickly as a result.

Preferably, the absorber device comprises a frequency-absorbing material applied in such a way that the electromagnetic waves are absorbed by the frequency-absorbing material in each case when they penetrate through the open aperture.

The frequency-absorbing material is a material that absorbs the signals or waves of the electromagnetic sensor system. The use of coats of paint or coatings of plastics or rubber for protection against radar identification, for example, is known from the prior art.

By way of example, the frequency-absorbing material can comprise a frequency-absorbing paint, e.g. a radar-absorbing paint. Furthermore or as an alternative thereto, the frequency-absorbing material can comprise some other frequency-absorbing coating such as e.g. foam and/or rubber and/or self-adhesive absorber films, etc. These are also known from the prior art.

Preferably, the absorber device comprises at least one reflector applied in such a way that the electromagnetic waves are reflected by the reflector in each case when they penetrate through the open aperture in such a way that they do not leave the absorber device again.

The absorber device can comprise at least one reflector applied such that the electromagnetic waves or signals of the electromagnetic sensor system that penetrate into the interior of the absorber device through an open aperture cannot leave the absorber device again.

In accordance with a second aspect, the object is achieved by means of a light signal installation comprising at least one absorber device according to the invention.

In particular, any already existing light system installation known from the prior art, in addition to conventional traffic lights, can be extended in each case by an absorber device mentioned above for the reliable identification and processing of signal states by electromagnetic sensor systems.

In accordance with a third aspect, the object is achieved by means of an assistance system for a vehicle, comprising: a detection unit comprising an electromagnetic sensor system for detecting an actual signal state of an absorber device; and
a vehicle control unit, which is communicatively and/or electrically connected to the detection unit and which is configured to take account of the detected actual signal state of the absorber device in the assistance function.

The assistance system can be a driver assistance system for a vehicle that is known from the prior art, the system, for the user, detecting the current signal state of conventional traffic lights with the aid of optical systems and outputting it by way of a suitable output device in the vehicle, e.g. the head-up display.

The driver assistance system can be replaced by the detection unit and/or extended by the detection unit comprising an electromagnetic sensor system.

Furthermore or as an alternative thereto, the assistance system can be an assistance system which is embodied and/or configured to carry out at least one autonomous driving mode for the vehicle. In other words, any vehicle with such an assistance system can drive autonomously. Such assistance systems are known from the prior art. This assistance system also comprises the detection unit comprising an electromagnetic sensor system. The electromagnetic sensor system can be used for other suitable purposes—such as e.g. for continuously generating a model of the surroundings of the vehicle.

The detection unit is configured, using the electromagnetic sensor system, to detect an actual signal state of an absorber device as described above, which corresponds to the current signal of the corresponding conventional traffic lights.

The assistance system additionally comprises a vehicle control unit, which is communicatively and/or electrically connected to the detection unit. The vehicle control unit is configured to take account of the detected actual signal state of the absorber device in the assistance function.

In the example of the driver assistance system, the signal state can be output robustly and in a fail-safe manner. In the example of autonomous driving, the autonomous driving mode, robustly and in a fail-safe manner, can detect signal states of already installed light system installations by virtue of the latter being extended by absorber devices.

Preferably, the assistance function comprises the partly autonomous or autonomous intervention:
  in the drive (longitudinal dynamics); and/or
  in the control (transverse dynamics); and/or
  in signaling units; and/or
  in communication units (e.g. Car-to-Car or communication between a vehicle and other vehicles, or Car-to-X or communication between vehicles and the surroundings) of the vehicle.

Preferably, the electromagnetic sensor system comprises:
  at least one radar sensor; and/or
  at least one lidar sensor; and/or
  at least one sonar sensor; and/or
  at least one camera system.

In accordance with a third aspect, the object is achieved by a vehicle comprising an assistance system according to the invention.

These and other objects, features and advantages of the present invention will be clarified from a study of the following detailed description of preferred embodiments and the accompanying figures. It is evident that—although embodiments are described separately—individual features therefrom can be combined to form additional embodiments.

DETAILED DESCRIPTION OF THE DRAWINGS

Figure 1B:
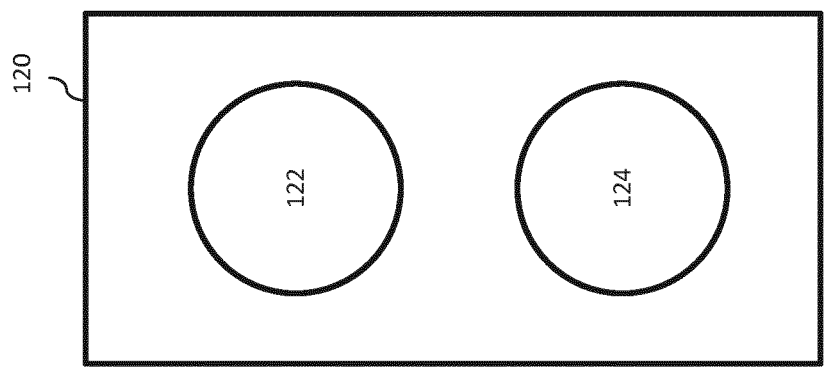
FIG. 1b schematically shows an exemplary absorber device for displaying signals of conventional light system installations.
Figure 1A:
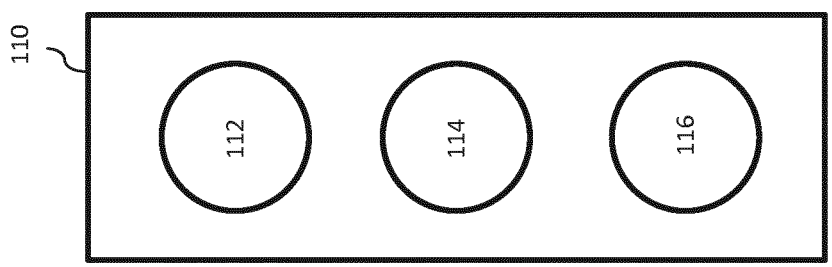
FIG. 1a schematically shows a conventional traffic light.

FIG. 1a schematically shows a conventional traffic light 110 used in known light system installations. A European light signal installation controls traffic with the aid of traffic lights that can display the three signal colors red, amber and green. The traffic light 110 comprises three different light signal transmitters 112, 114, 116, which respectively display one of the signal colors. The signal color red is generally displayed by the topmost light signal transmitter 112 and signals to the driver of the vehicle that entering or driving on is not permitted. The signal color amber is generally displayed by the middle light signal transmitter 114 and signals to the driver of the vehicle the need to wait for the next signal, displayed either by the signal color red or green. The signal color green is generally displayed by the bottom light signal transmitter 116 and signals to the driver of the vehicle that traffic has been released. In this case, these light signals of the traffic light 110 are directed to the respective driver of a vehicle.

FIG. 1b schematically shows an exemplary absorber device 120 for displaying signals of conventional light system installations that can be detected dependably and reliably by electromagnetic sensor systems. The absorber device 120 can display the luminous signals of the traffic lights 110 by way of correspondingly assigned signal states with the aid of at least one aperture 122, 124. In this example, however, two apertures 122, 124 are shown.

The term electromagnetic sensor systems encompasses sensor systems which, by emitting signals or waves and by detecting the signals or waves reflected or backscattered from the atmosphere, are able to create a model of the surroundings or parts of a model of the surroundings of a vehicle. Each electromagnetic sensor system can comprise at least one radar sensor, at least one lidar sensor and/or at least one sonar sensor. Furthermore, the term electromagnetic sensor systems also encompasses camera systems that operate with light in the visible range. These systems do not emit electromagnetic waves, but can generate a model of the surroundings by the reception of electromagnetic signals which—irrespective of what source sent them—were reflected by or at objects.

The geometry and the surface material of the absorber device 120 are such that they reflect or backscatter the signals or waves of the electromagnetic sensor systems. The electromagnetic sensor systems can thus identify the absorber device 120.

The absorber device 120 comprises at least one aperture 122, 124. Each aperture 122, 124 or opening is an opening through which the signals or waves of the electromagnetic sensor systems can penetrate into the absorber device 120. Each of the apertures 122, 124 is able to be opened and closed by means of an aperture closure 230 (cf. FIGS. 2a and 2b). Each aperture 122, 124 can be able to be opened and closed by means of a dedicated, highly reliable mechanism. Dependable or highly reliable mechanisms are known from the prior art; by way of example, a spring system using an electromagnet as actuator can be employed as a closing mechanism (not shown). In another example, it is also possible to employ opening mechanisms with diversity, e.g. electromagnetic and pneumatic, in order to reduce the probability of failure. The safety-relevant signal state "red" could be represented or mapped in particular by an energyless basic state "normally closed".

If the respective aperture 122, 124 is closed, the signals or waves of the electromagnetic sensor systems are also reflected in the region of the respective aperture 122, 124 and the backscattered signals or waves are received by the respective sensor system again. In other words, the sensor system cannot differentiate the respectively closed aperture 122, 124 from the housing of the absorber device (as described in greater detail further below with reference to FIG. 2b).

If a respective aperture 122, 124 is open, the absorber device 120 is embodied in such a way that the signals or waves of electromagnetic sensor systems penetrate into the interior of the absorber device 120 through the aperture 122, 124, but cannot leave the interior of the absorber device 120 again (as described in greater detail further below with reference to FIG. 2a).

To that end, the absorber device 120 can comprise a frequency-absorbing material applied in such a way that the electromagnetic waves are absorbed by the frequency-absorbing material in each case when they penetrate through the open aperture 122, 124.

The frequency-absorbing material is a material that absorbs the signals or waves of the electromagnetic sensor system. The use of coats of paint or coatings of plastics or rubber for protection against radar identification, for example, is known from the prior art. By way of example, the frequency-absorbing material can comprise a frequency-absorbing paint, e.g. a radar-absorbing paint. Furthermore or as an alternative thereto, the frequency-absorbing material can comprise some other frequency-absorbing coating such as e.g. foam and/or rubber and/or self-adhesive absorber films, etc. These are also known from the prior art.

Furthermore or as an alternative thereto, the absorber device 120 can comprise at least one reflector 240 applied in such a way that the electromagnetic waves are reflected by the reflector 240 in each case when they penetrate through the open aperture 122, 124 into the housing of the absorber device 120 in such a way that they do not leave the interior of the absorber device 120 again. In other words, the reflector 240 is applied in such a way that the electromagnetic waves or signals of the electromagnetic sensor system that penetrate into the interior of the absorber device 120 through the respective open aperture 122, 124 cannot, however, leave the absorber device 120 again.

As a result, electromagnetic sensor systems are able to differentiate the aperture 122, 124 in the open state unambiguously from the housing of the absorber device 120.

Advantageously, signal states of conventional traffic lights can thus be mapped by means of the absorber device in a reliable manner for electromagnetic sensor systems.

By way of example, the following signal states of an absorber device 120 can reproduce the luminous signals of a traffic light 110:

| Traffic light 110 | Absorber device 120 |
| --- | --- |
| Red 112: | Both apertures 122, 124 are closed (ideally "normally closed"); |
| Amber 114: | One aperture 122 or 124 is open and the respective other aperture 122 or 124 is closed; |
| Green 116: | Both apertures 122 and 124 are open. |

Any other suitable assignment of signal states of the absorber device 120 with respect to the display of the luminous signals of a traffic light 110 is also possible.

Electromagnetic sensor systems operate with electromagnetic wavelengths that can be used reliably over a very wide atmospheric interference range. In other words, electromagnetic sensor systems can be used independently of the weather. Existing traffic light installations can be extended in a simple manner by absorber systems 120, the signal state of which can be detected dependably and reliably by electromagnetic sensor systems. This is of major importance, particularly for autonomous driving. However, conventional driver assistance systems that display traffic light signals to the user by way of an output unit in the vehicle can also benefit from the reliable identifiability of the signal states of absorber systems 120 by way of electromagnetic sensor systems.

Electromagnetic sensor systems can thus differentiate the aperture 122, 124 from the housing of the absorber device since no signals or waves are backscattered.

Figure 2B:
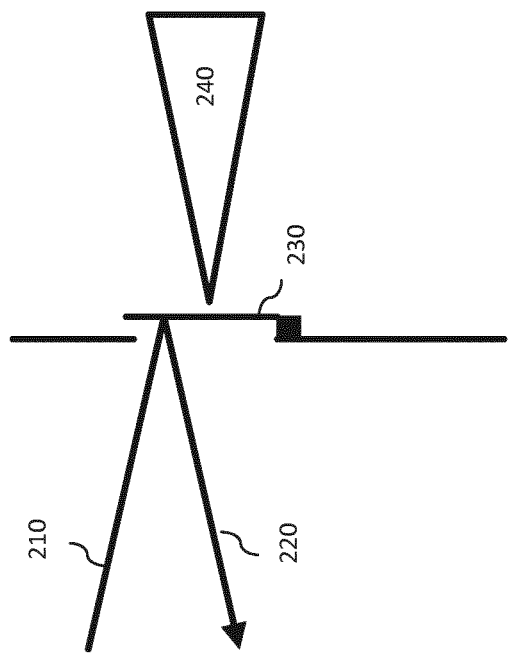
FIG. 2b schematically shows an aperture of an absorber device in the closed state.
Figure 2A:
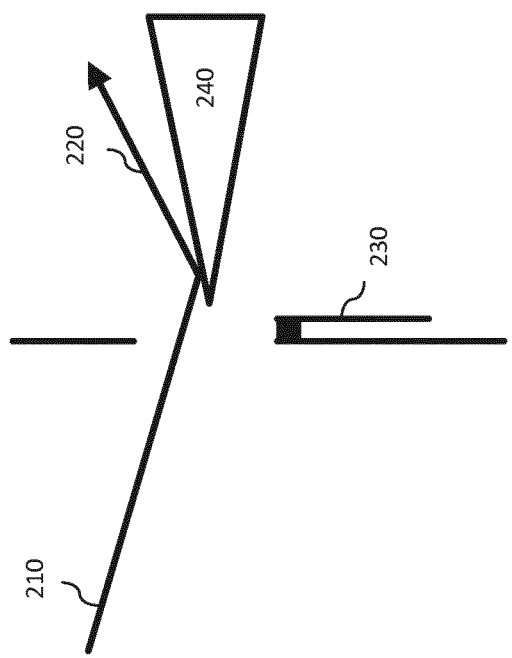
FIG. 2a schematically shows an aperture of an absorber device in the open state.

FIG. 2a shows an aperture 122, 124 of an absorber device 120, wherein the aperture closure 230 opens the aperture 122, 124. In this example, electromagnetic waves or signals 210 of an electromagnetic sensor system (as described further above) penetrate into the housing of the absorber device 120 through an open aperture 122, 124. The electromagnetic waves 210 are reflected by the reflector 240 in the housing of the absorber device 120 in such a way that they do not leave the absorber device 120 or the housing of the absorber device 120 again. In other words, the reflector 240 is applied in such a way that the electromagnetic waves or signals 210 of the electromagnetic sensor system that penetrate into the interior of the absorber device 120 through the respective open aperture 122, 124 are reflected. However, the reflected electromagnetic waves 220 cannot leave the housing or the interior of the absorber device 120 again.

Furthermore or as an alternative thereto, the absorber device 120 can comprise a frequency-absorbing material (not shown) applied in such a way that the electromagnetic waves 210 are absorbed by the frequency-absorbing material in each case when they penetrate through the open aperture 122, 124.

FIG. 2b shows an aperture 122, 124 of an absorber device 120, wherein the aperture closure 230 closes the aperture 122, 124. In this example, the electromagnetic waves or signals 210 of an electromagnetic sensor system impinge on the aperture closure 230, which closes the aperture 122, 124 or the housing of the absorber device 120. The electromagnetic waves 210 are reflected by the closed aperture closure 230, such that the electromagnetic sensor system can receive and correspondingly evaluate the backscattered signals or waves 220.

Electromagnetic sensor systems thus cannot differentiate the aperture 122, 124 from the housing of the absorber device 120. In another example, the surface of the absorber closure could consist of a highly reflective material or comprise highly reflective material. In this case, to the electromagnetic sensor system the aperture closures would appear "brighter" than the housing of the absorber device 120.

The difference or the contrast between reflection and absorption is thus crucial for the perception of the electromagnetic sensor systems. The difference or contrast should be maximized in order not to have to demand an excessively high sensor sensitivity. This requirement also reduces the likelihood of the failure of the safety function "correct identification of the traffic light signal".

Figure 3:
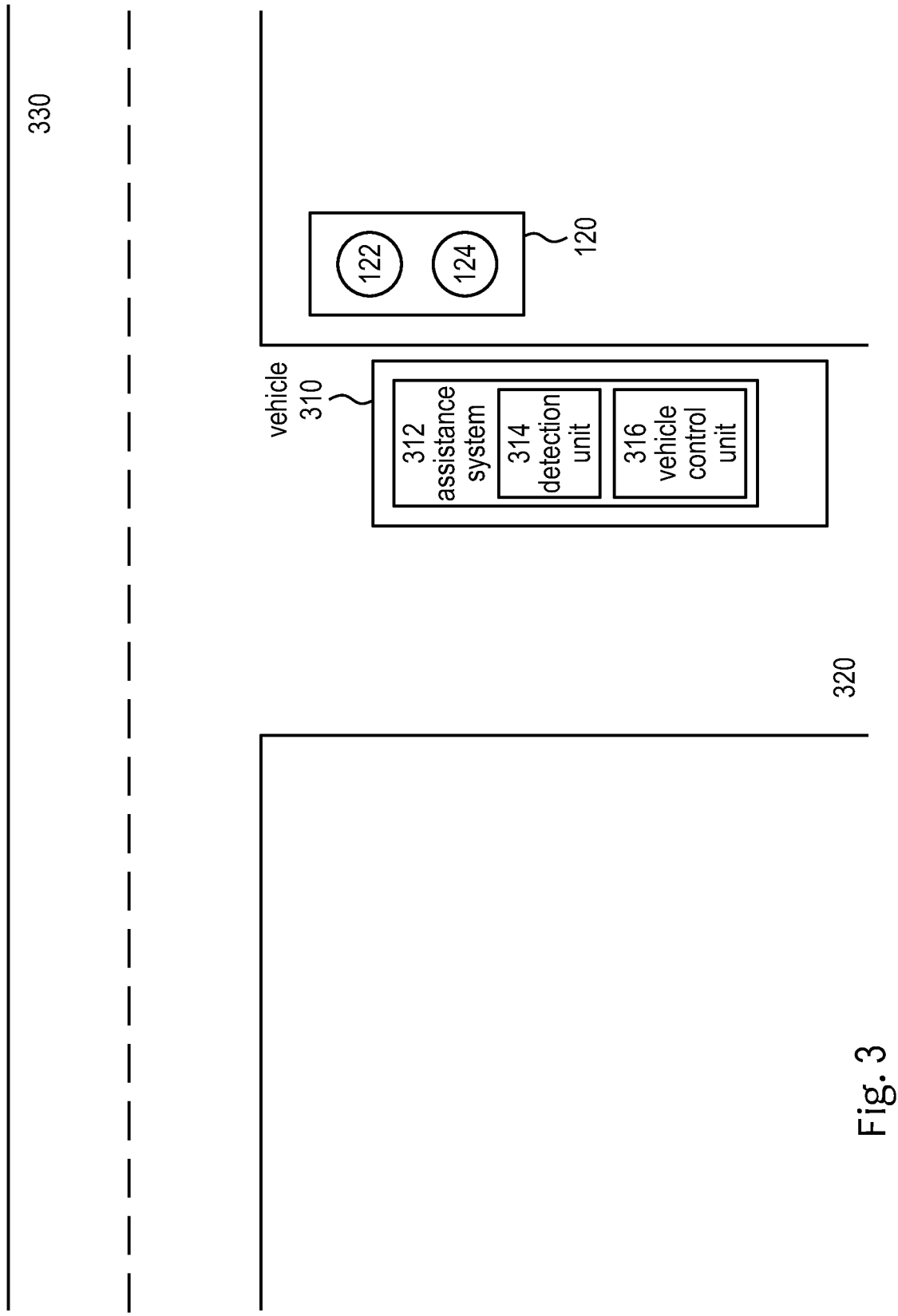
FIG. 3 schematically shows an intervention at which is located a vehicle comprising an assistance system for detecting and processing signal states of conventional light system installations that are displayed by an absorber device.

FIG. 3 schematically shows a junction 320, at which is located a vehicle 310 comprising an assistance system 312 for detecting and processing signal states that are displayed by an absorber device 120 with the aid of apertures 122, 124 that are able to be opened and closed as described above.

In this example, entry to the road 330 from the junction 320 is regulated by a light system installation comprising conventional traffic lights 110 (not shown). In addition, an absorber device 120 as described further above is situated before the junction to the road 330.

The vehicle 310 can move in an autonomous mode, for example. The assistance system 312 comprises a detection unit 314. The detection unit 314 comprises an electromagnetic sensor system (not shown) for detecting an actual signal state of the absorber device 120.

The assistance system 312 can be a driver assistance system for a vehicle 310 that is known from the prior art, the system, for the user, detecting the current signal state of conventional traffic lights 110 with the aid of optical systems and outputting it by way of a suitable output device in the vehicle 310, e.g. the head-up display.

The driver assistance system can be replaced by the detection unit and/or extended by the detection unit 314 comprising an electromagnetic sensor system.

Furthermore or as an alternative thereto, the assistance system 312 can be an assistance system 312 which is embodied and/or configured to carry out at least one autonomous driving mode for the vehicle 310. In other words, any vehicle 310 with such an assistance system 312 can drive autonomously. Systems for producing autonomous driving modes are also known from the prior art and can be extended by the assistance system 312 comprising the detection unit 314 comprising an electromagnetic sensor system. The electromagnetic sensor system can comprise, besides a camera system that operates with ambient light or the light from the traffic light installation, at least one radar sensor; and/or
at least one lidar sensor; and/or
at least one sonar sensor.

The detection unit 314 is configured, using the electromagnetic sensor system, to detect an actual signal state of the absorber device 120 as described above, which corresponds to the current signal of the corresponding conventional traffic light at the junction.

By way of example, the following signal states of an absorber device 120 can reproduce the luminous signals of a traffic light 110:

| Traffic light 110 | Absorber device 120 |
|---|---|
| Red 112: | Both apertures 122, 124 are closed; |
| Amber 114: | One aperture 122 or 124 is open and the respective other aperture 122 or 124 is closed; |
| Green 116: | Both apertures 122 and 124 are open. |

The assistance system 312 additionally comprises a vehicle control unit 316, which is communicatively and/or electrically connected to the detection unit 314 and which is configured to take account of the detected actual signal state of the absorber device 120 in the assistance function. The assistance function can comprise for example the partly autonomous or autonomous intervention in the drive; and/or
in the control; and/or
in signaling units; and/or
in communication units
of the vehicle 310.

In the example of the driver assistance system mentioned above, the traffic light signal can be output robustly and in a fail-safe manner by means of the actual signal state of the absorber device. In the example of autonomous driving mentioned above, the autonomous driving mode, robustly and in a fail-safe manner, can detect signals of already installed light system installations using traffic lights 110 by virtue of the latter being extended by corresponding absorber devices 120 robustly and in a fail-safe manner and can use them for carrying out autonomous driving.

What is claimed is:

1. A device for a light signal installation for electromagnetic sensor systems, comprising:
   a switchable absorber device having at least one aperture, each of which is able to be opened and closed by way of an aperture closure,
   wherein the absorber device is configured such that in each case:
      when the aperture is open, electromagnetic waves incoming through the aperture do not leave the absorber device again; and
      when the aperture is closed, electromagnetic waves impinging thereon are reflected, and
   wherein the absorber device is configured to be physically separate from light signal transmitters of the light signal installation that display signal colors, such that the absorber device does not affect light entering the light signal transmitters.

2. The device according to claim 1, wherein
   the absorber device comprises at least one frequency-absorbing material applied such that the electromagnetic waves are absorbed by the frequency-absorbing material in each case when the waves penetrate through an open aperture.

3. The device according to claim 1, wherein
   the absorber device comprises at least one reflector arranged such that the electromagnetic waves are reflected by the reflector in each case when the waves penetrate through the open aperture and do not leave the absorber device again.

4. A light signal installation comprising at least one device according to claim 1.

5. An assistance system for a vehicle, comprising:
   a detection unit comprising a sensor system for detecting an actual signal state indicated by an absorber device for a light signal installation for sensor systems; and
   a processor, which is communicatively and/or electrically connected to the detection unit and which is configured to take account of the actual signal state indicated by the absorber device in performing an assistance function.

6. The assistance system according to claim 5, wherein the assistance function comprises a partly autonomous or an autonomous intervention:
   in the drive;
   in the control;
   in signaling units; and/or
   in communication units,
   of the vehicle.

7. The assistance system according to claim 5, wherein the sensor system comprises one or more of:
   at least one radar sensor;
   at least one lidar sensor; and
   at least one sonar sensor.

8. A vehicle comprising an assistance system according to claim 5.

* * * * *